June 20, 1939.  B. BARNES  2,163,532
MANUFACTURE OF ABRASIVE ALUMINA
Filed Sept. 22, 1937
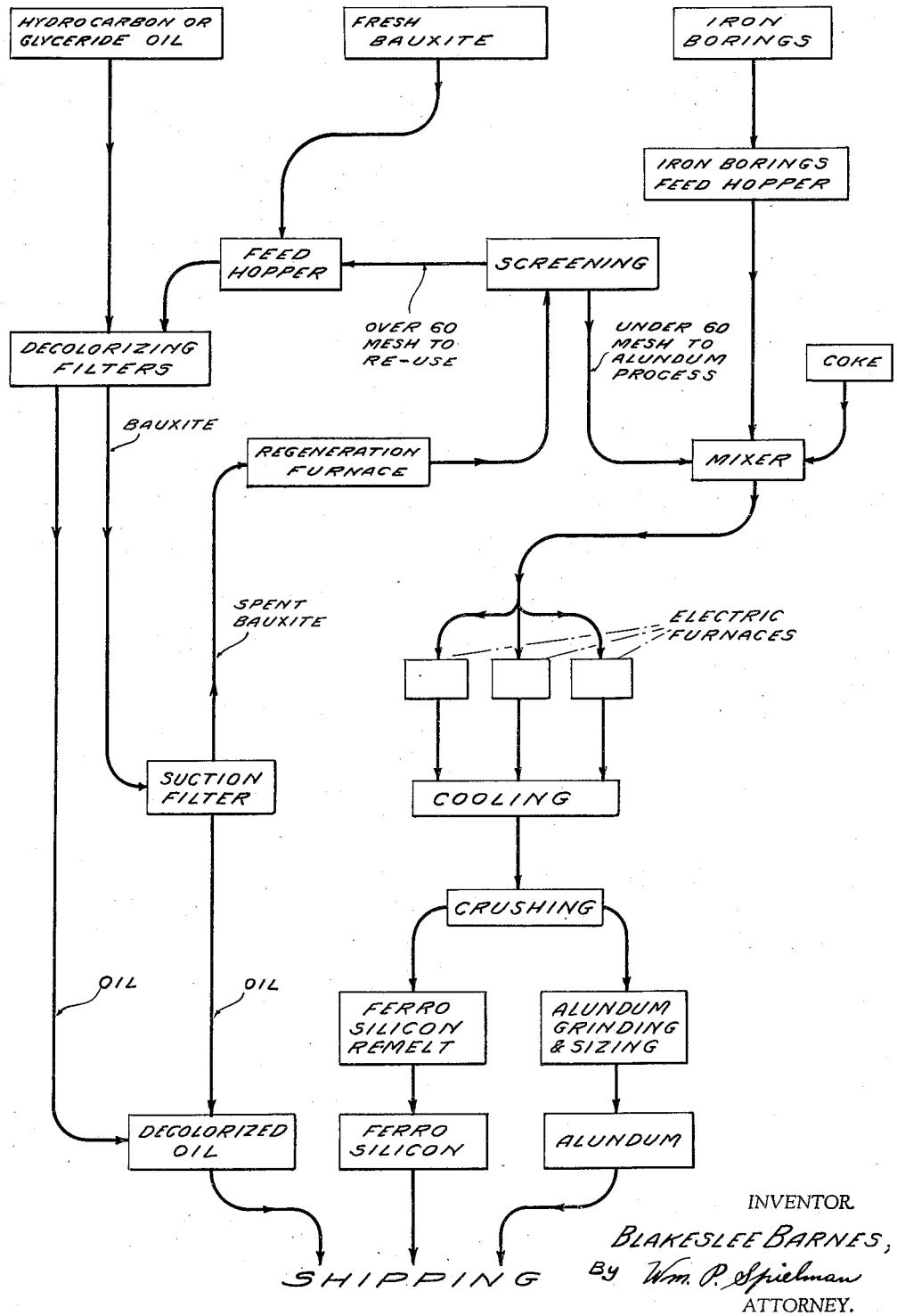

Patented June 20, 1939

2,163,532

UNITED STATES PATENT OFFICE 2,163,532

MANUFACTURE OF ABRASIVE ALUMINA

Blakeslee Barnes, New York, N. Y., assignor to Chemical Construction Corporation, New York, N. Y., a corporation of Delaware Application September 22, 1937, Serial No. 165,045

10 Claims. (Cl. 23—142)

This invention relates to the manufacture of fused alumina and similar abrasives consisting substantially of oxides of aluminum. An object of the invention is to provide a process for the manufacture of fused alumina abrasives utilizing a new class of raw materials which have hitherto been considered as waste products of no value. A second object is to provide a method of preparing abrasive alumina from bauxite and similar compounds of alumina which are finely divided, as distinguished from the coarse bauxite which has hitherto been used in the preparation of this material. A still further object of the invention is the treatment of finely divided bauxite with liquid carbonaceous material in order to impregnate the same with a finely divided reducing agent, thereby obtaining a material which is particularly well suited for fusion at temperatures substantially lower than those which are now employed. Still further objects will become apparent from the following description and will be pointed out in the appended claims.

The material known as "fused alumina" or "abrasive alumina" and perhaps better known by the proprietary trade name "Alundum" is essentially crystalline $Al_2O_3$, but also contains smaller amounts of other constituents. Titanium oxide is frequently present, for example, and is regarded as increasing the toughness of the abrasive. Other materials such as iron, silica, small amounts of alkaline earth metals, etc., may also be found in the finished product. The present invention may be employed in the production of "fused alumina" and similar abrasives of any desired degree of purity, and for this reason the term "abrasive alumina" will be used in the following specification and claims to denote an abrasive of commercial utility consisting substantially of fused aluminum oxide, with or without titanium, iron, silica and other materials normally found in such products. In some cases, and particularly on the accompanying drawing, the term "Alundum" is employed, but it is understood that this term has the same meaning as "abrasive alumina" as defined above.

The manufacture of abrasive alumina is essentially the fusion of minerals or other compounds containing aluminum in the form of $Al_2O_3$, with or without other impurities such as oxides of iron, silica, titanium and other metals, preferably with the addition of a flux such as metallic iron. Whenever the alumina contains reducible metal oxides such as $Fe_2O_3$ it is customary to add carbon in the form of coke in order to reduce the oxide to the metal, in which form it will combine with the silica present and appear as ferrosilicon.

The chief raw material now used for the manufacture of "Alundum" and other brands of abrasive alumina is bauxite, which is a hydrated oxide of aluminum containing oxides of iron, silicon, titanium and in some cases calcium and magnesium. The term "bauxite" is applied generally to the class of minerals consisting essentially of hydrated aluminum oxides, and it is understood that any material falling within this broad terminology may be used in practicing the present invention. Analyses of typical bauxites are given, for example, in Mellor "Inorganic and Theoretical Chemistry" vol. 5, page 250. Bauxite as mined for the abrasive manufacturing trade in the United States analyzes approximately as follows:

|   | Per cent |
|---|---|
| Loss on ignition | 31 |
| $Al_2O_3$ | 58 |
| $SiO_2$ | 4 |
| $TiO_2$ | 2 |
| $Fe_2O_3$ | 5 |
| Total | 100 |

The amount of silica, titanium and ferrous oxide of course can vary within certain limits, but the above analysis is an approximate average of the ore used. The ore is calcined and after calcining the analysis will be about as follows:

|   | Per cent |
|---|---|
| Loss on ignition | 1 |
| $Al_2O_3$ | 83 |
| $SiO_2$ | 6 |
| $TiO_2$ | 3 |
| $Fe_2O_3$ | 7 |
| Total | 100 |

For "Alundum" manufacture the bauxite is usually crushed 1½ inches or under before calcination; after calcination it is crushed to approximately ⅛ inch size and then mixed with dry coke, the quantity of coke being approximately 45 lb. per 1000 lb. of bauxite. To this mixture is added 75 lb. of metallic iron, usually in the form of "borings", together with titanium if sufficient is not already present in the bauxite. This charge is fed to an electric arc furnace where it requires a temperature of 2000° C. or higher and a time of approximately 24 hours to complete the fusion. The coke in the above mixture is added to reduce the Fe₂O₃ to Fe and the additional iron is added to remove the SiO₂ from the melt and form ferrosilicon therewith. While the mass is still in a molten state the ferrosilicon sinks to the bottom and is easily removed from the "Alundum" pig. After cooling, this pig is crushed to the desired size and mixed with suitable binders for the manufacture of abrasives.

It will be noted from the above outline of the present commercial process of "Alundum" manufacture, first, that relatively coarse calcined bauxite and coarse dry coke are employed, and secondly that the extremely high furnace temperature of 2000° C. is necessary to complete the fusion. I have found that by obtaining a more intimate mixture between the reducing agent and the bauxite it is possible to manufacture abrasive alumina of a high grade with a substantial reduction in the furnace temperature.

In order to obtain the intimate admixture between the bauxite and the reducing agent which is necessary before a substantial reduction in the furnace temperature can be obtained, I take advantage of the porous and adsorptive characteristics of calcined bauxite. This material will readily absorb relatively large amounts of carbonaceous materials and other reducing agents of this class, and in fact it is now in wide commercial use for this purpose in the decolorizing of mineral and glyceride oils. The present invention presents, therefore, as a principal feature the manufacture of abrasive alumina by fusing bauxite which contains a finely divided reducing agent impregnated therein with or without the addition of fluxes or additional amounts of reducing agents such as coke.

By using bauxite in which a substantial proportion of the reducing agent has been impregnated, I have found that it is possible to use materials of much smaller particle size than have hitherto been employed, and in fact very finely divided bauxite of less than 60 mesh particle size may be used for this purpose. This discovery opens up a new field for the use of classes of bauxite which have hitherto been considered as waste materials, since they are too finely divided for use as decolorizing adsorbents.

As an example of this feature of the invention, I may take the bauxite fines which are obtained in the mining, crushing and calcining of bauxite for other purposes and soak them, with or without a preliminary calcination, in carbonaceous material such as petroleum, acid sludge from oil refining, fuel oil, spent lubricating oil from the crank cases of internal combustion engines, etc. The impregnated material is then calcined at or below red heat with hot combustion gases, or by burning out the excess oil in the presence of limited amounts of air, whereby the pores of the bauxite are impregnated with a finely divided carbonaceous reducing agent. This soaking or impregnation with oil, followed by calcination, may be repeated as often as desired to obtain a bauxite containing the required amount of finely divided reducing agent.

In addition to finely divided bauxite which has been artificially impregnated with reducing agents for the sole purpose of "Alundum" manufacture in accordance with the present invention, I have also found, as another important feature of the invention, that spent bauxite produced in the decolorizing of mineral oils, vegetable oils, animal oils, marine oils and the like is also well suited for the manufacture of abrasive alumina.

From the above it will be seen that the invention consists essentially in the manufacture of "Alundum" by the fusion of bauxite containing suitable reducing agents such as carbonaceous material impregnated into the pores thereof. Inasmuch as large quantities of material corresponding to this definition are discarded every day by oil manufacturers as worthless, I prefer to utilize this spent bauxite as a raw material in practicing my invention. It is apparent, however, that the bauxite fines which are an undesired by-product of the mining, crushing and calcining of bauxite for other purposes may also be impregnated with carbonaceous materials such as mineral oils, glyceride oils and particularly with the acid sludge which is a by-product from the sulfuric acid refining of mineral oils, and used after a preliminary calcination. It will also be seen that the invention in its broader aspects is not limited to the particular method of obtaining the bauxite impregnated with the finely divided reducing agent but that material of this nature from any suitable source may be employed. In its more limited aspects, however, the invention includes the use of finely divided bauxite impregnated by certain specific processes, and one such process is illustrated diagrammatically in the flow sheet constituting the accompanying drawing. Another process constitutes the subject matter of my copending application Serial No. 165,046, filed concurrently herewith.

In the accompanying drawing the single figure is a flow sheet of a process in which abrasive alumina of the grade known commercially as "Alundum" and ferrosilicon are manufactured from spent bauxite obtained as a by-product in the refining of hydrocarbon or glyceride oils.

Referring to the drawing it will be seen that fresh calcined bauxite of 40–60 mesh having an analysis similar to that previously given, is used in admixture with regenerated bauxite for the decolorizing of hydrocarbon or glyceride oils. The regenerated bauxite, with addition of fresh material to make up for that lost in screening may be agitated with the oil and the purified oil separated by settling and decantation. I have illustrated, however, a preferred purification process in which the oil is continuously trickled through a filter bed of the calcined bauxite until the filter becomes clogged with impurities, whereupon the remaining oil is withdrawn by a vacuum and the spent bauxite may be regenerated for further use. The spent bauxite is introduced into a regeneration furnace where it is calcined in the presence of air at 1500° F. to burn out as much as possible of the carbonaceous impurities after which it is cooled, screened, and the material remaining on a 60 mesh screen is returned to the process. The screenings from the above process and the dust collected from the stack are mixed in a mixer with a small amount of coke and with sufficient metallic iron in the form of iron borings to form a flux with the silica present in the bauxite. The mixture is then introduced into electric furnaces where it will fuse at temperatures between 1600 and 1800° C., as compared with the temperature of 2000° C. which is necessary in present day processes. This reduction in temperature resulting from the use of bauxite which has been impregnated with a finely divided reducing agent represents a large saving in the electric power necessary to heat the furnaces, for the heat lost by radiation in the highest temperature ranges is a large item. It also reduces the wear and tear on the arc furnaces now used for fusing alumina, and permits the construction of larger furnaces from less expensive materials.

After removal of the ferrosilicon and the "Alundum" pig from the furnace they are cooled and crushed and the "Alundum" is ground and sized. The coarser "grit" is between 8 and 14 mesh and is used in the manufacture of heavy abrasive wheels; that between 14 and 24 mesh is used for rough grinding apparatus, and the finer material is used for smaller and more refined abrasive equipment.

The ferrosilicon is usually remelted and cast into bars or pigs, in which form it is sold as a valuable by-product.

From the above, it will be seen that the invention provides not only a process of manufacture of abrasive alumina in which the furnace temperatures are substantially reduced, but also a process of manufacturing this material from new classes of raw materials. It will be apparent to those skilled in this art that variations and modifications of the specific features given by way of example may be made without departing from the invention, which is limited only by the scope of the claims appended hereto.

What I claim is:

1. A method of preparing abrasive alumina which comprises fusing bauxite containing a reducing agent impregnated therein.

2. A method of preparing abrasive alumina which comprises fusing bauxite of a particle size less than 60 mesh containing a reducing agent impregnated therein, together with a flux.

3. A method of preparing abrasive alumina which comprises impregnating bauxite with a liquid carbonaceous material, calcining to form a finely divided reducing agent within the pores of the bauxite, mixing the calcined material with a flux, and fusing the mixture.

4. A method according to claim 3 in which the carbonaceous material is a liquid selected from the group consisting of vegetable oils, animal oils, marine oils, mineral oils and acid sludges resulting from the sulfuric acid refining of mineral oils.

5. A process of manufacturing abrasive alumina and ferrosilicon which comprises fusing a mixture of carbon, iron and finely divided bauxite containing a reducing agent impregnated therein, cooling and crushing the resulting mixture, and separating the ferrosilicon and the abrasive alumina in the crushed mixture.

6. A method of producing abrasive alumina which comprises heating to temperatures not substantially greater than 1800° C. a mixture of carbon, bauxite containing a reducing agent impregnated therein, and a flux.

7. A method of producing abrasive alumina and ferrosilicon which comprises heating to temperatures not substantially greater than 1800° C. a mixture of carbon, bauxite containing a reducing agent impregnated therein, and metallic iron.

8. A method of producing abrasive alumina and ferrosilicon which comprises heating to temperatures not substantially greater than 1800° C. a mixture of carbon, bauxite of a particle size less than 60 mesh containing a reducing agent impregnated therein, and metallic iron.

9. A method of producing abrasive alumina which comprises fusing spent bauxite from the adsorption purification of oils.

10. A method of producing abrasive alumina which comprises fusing bauxite that has been impregnated with a carbonaceous reducing agent by use as a heat transfer medium in the pyrolytic decomposition of acid sludge.

BLAKESLEE BARNES.